United States Patent [19]
Uehara et al.

[11] Patent Number: 5,459,511
[45] Date of Patent: Oct. 17, 1995

[54] CAMERA HAVING IMPROVED POSITIONING OF A VARIABLE APERTURE

[75] Inventors: Ryo Uehara, Yokohama; Satoshi Ejima, Tokyo, both of Japan

[73] Assignee: Nikon Corporation, Tokyo, Japan

[21] Appl. No.: 336,658

[22] Filed: Nov. 4, 1994

[51] Int. Cl.$^6$ .................................................. H04N 5/232
[52] U.S. Cl. .......................... 348/335; 348/363; 348/341; 354/219; 354/410
[58] Field of Search ..................................... 348/335, 340, 348/341, 362, 363, 364; 354/219, 224, 410; H04N 5/232

[56] References Cited

U.S. PATENT DOCUMENTS

| | | | |
|---|---|---|---|
| 4,544,250 | 10/1985 | Tanaka et al. | 348/341 X |
| 4,623,932 | 11/1986 | Inoue et al. | 348/341 X |
| 4,918,538 | 4/1990 | Saito et al. | 348/363 X |
| 5,115,319 | 5/1992 | Arai et al. | 348/363 X |

*Primary Examiner*—Wendy R. Greening

[57] ABSTRACT

A camera having improved positioning of a variable aperture. A picture taking lens forms an image of a subject on an image forming plane. A picture taking optical system has a picture taking optical path which extends from the image forming plane to an image recording medium. The picture taking optical system receives the image formed on the image forming plane and projects the image to the image recording medium. A variable aperture is positioned in the picture taking optical path between the image forming plane and the image recording medium, and regulates light passing through the picture taking optical system without regulating light passing through a viewfinder optical system. Before an individual photograph is taken, the variable aperture is set to an aperture size which is approximately midway between the maximum aperture size and the minimum aperture size. However, when the camera is in a continuous shooting mode, a variable aperture control device sets the variable aperture to a first aperture size before a first photograph is taken and then, after the first photograph is taken, drives the variable aperture directly to a new aperture size corresponding to the next photograph. The camera also controls the camera shutter to be released after a specific, constant time from the pressing of the release button.

22 Claims, 15 Drawing Sheets

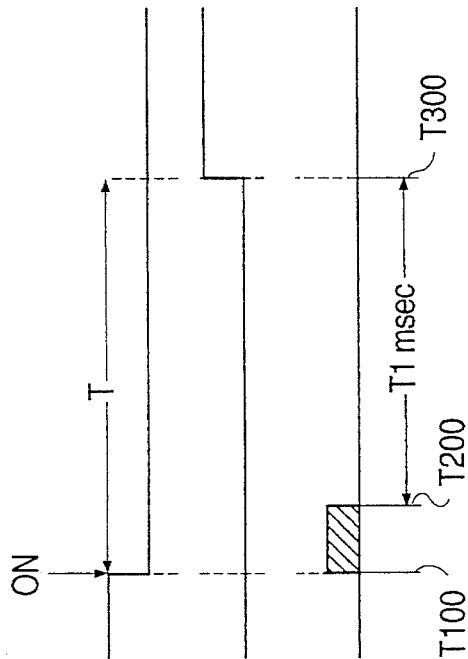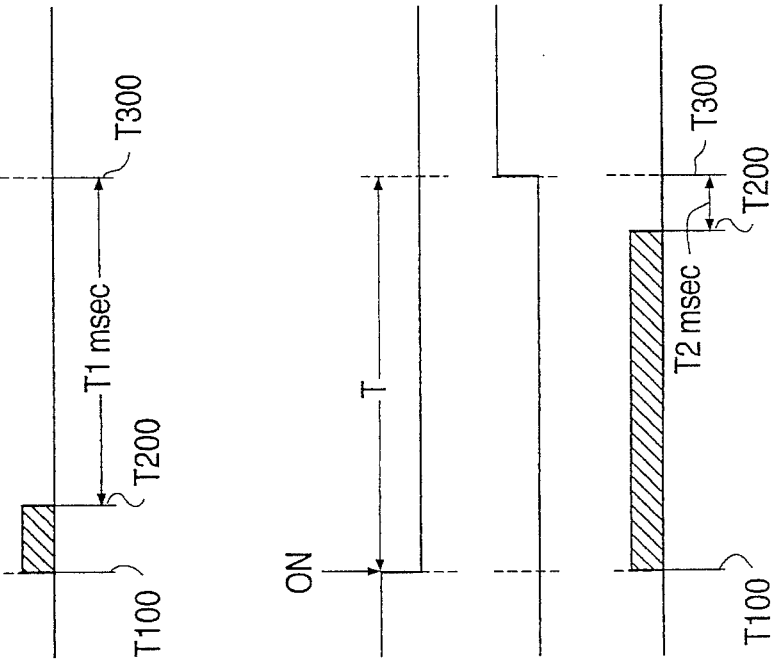
FIG. 2A PRIOR ART
FIG. 2B PRIOR ART
FIG. 2C PRIOR ART
FIG. 3A PRIOR ART
FIG. 3B PRIOR ART
FIG. 3C PRIOR ART

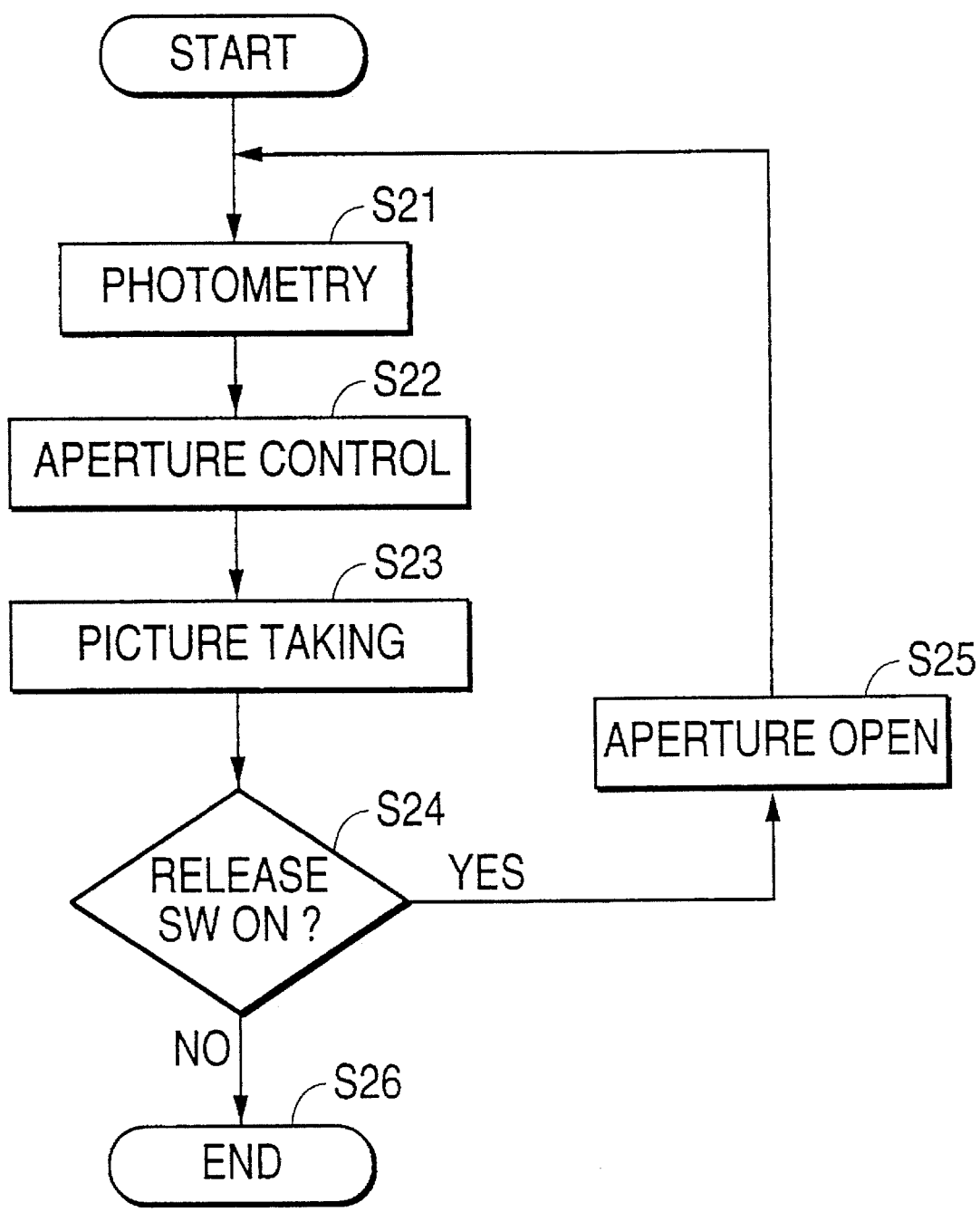

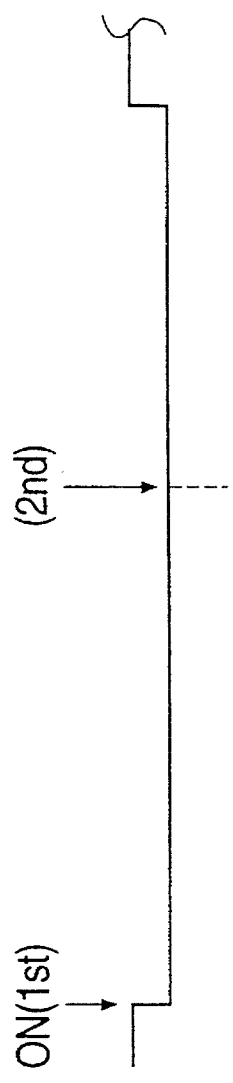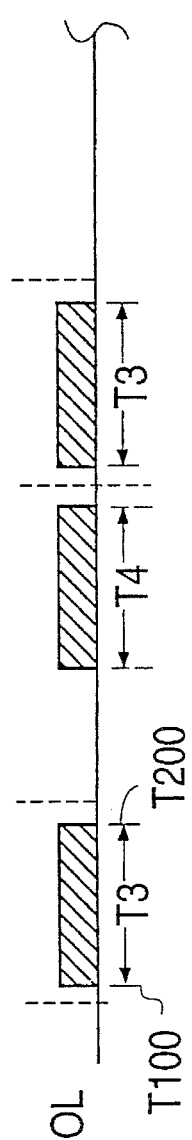
FIG. 5A PRIOR ART
FIG. 5B PRIOR ART
FIG. 5C PRIOR ART

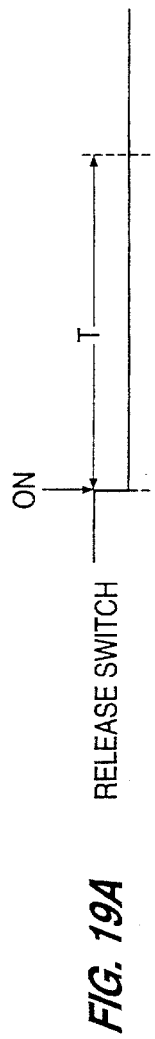
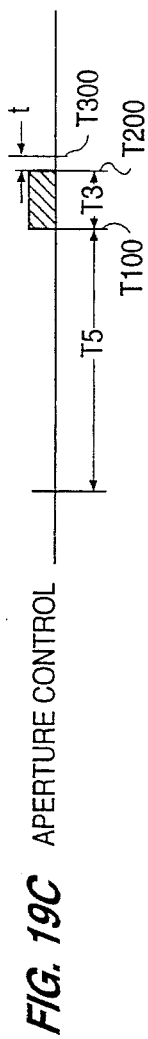
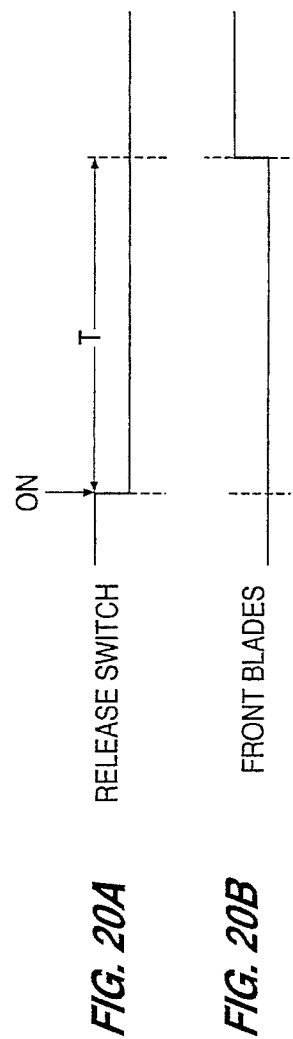
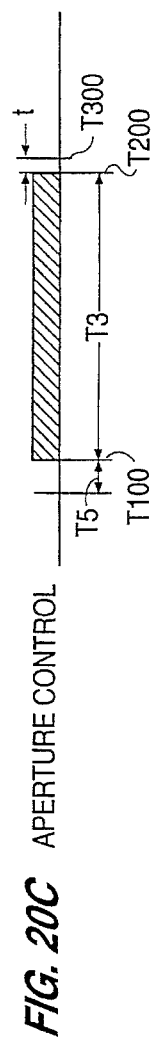
*FIG. 19A* RELEASE SWITCH
*FIG. 19B* FRONT BLADES
*FIG. 19C* APERTURE CONTROL
*FIG. 20A* RELEASE SWITCH
*FIG. 20B* FRONT BLADES
*FIG. 20C* APERTURE CONTROL

CAMERA HAVING IMPROVED POSITIONING OF A VARIABLE APERTURE

BACKGROUND OF THE INVENTION

1. Field of the Invention

The present invention relates to a camera equipped with a viewfinder optical system that guides the luminous flux of the subject to the viewfinder, and a picture taking optical system that guides the luminous flux of the subject to an image pickup element, where a variable aperture is positioned so that it affects light entering the picture taking optical system and does not affect light entering the viewfinder optical system.

2. Description of the Related Art

FIG. 1 is a diagram illustrating a conventional electronic still camera comprising a quick-return mirror 2 arranged behind a picture taking lens 1. Picture taking lens 1 includes a built-in variable aperture 1a. The diameter of variable aperture 1a varies from a maximum aperture value (representing a fully open aperture) to a minimum aperture value in order to control the quantity of light passing through variable aperture 1a. A focusing screen 3, a field lens 4, and a pentagonal prism 5 are arranged above quick-return mirror 2. An eyepiece 6 and a photometric element 7 are positioned to the right of pentagonal prism 5. A shutter 8, a field lens 9 and a mirror 10 are arranged behind quick-return mirror 2. Shutter 8 is a conventional shutter which comprises front blades (not illustrated) and rear blades (not illustrated). A mirror 11 is positioned in the path of the reflected light from mirror 10 and reflects the reflected light in a direction which is parallel to the optical axis of picture taking lens 1. A relay lens 12, an optical low-pass filter 13, and an image pickup element 14 are arranged to receive the light reflected by mirror 11. Luminous flux condensed by picture taking lens 1 passes through variable aperture 1a, is reflected by quick-return mirror 2, and is formed into an image on focusing screen 3. The image formed on focusing screen 3 is observed by a photographer 15 through field lens 4, pentagonal prism 5 and eyepiece 6. Also, a portion of the luminous flux diffused by focusing screen 3 enters photometric element 7.

A release button (not illustrated) is positioned on the camera so that a photographer can press the release button. The release button typically has two positions: (1) a half-push position in which the release button is pushed half-way by the photographer, and (2) a full-push position in which the release button is fully pushed by the photographer. A release switch (not illustrated) turns ON when the release button is pressed to the full-push position. Photometry is performed when the photographer presses the release button to the half-push position. When the photographer presses the release button to the full-push position, quick-return mirror 2 moves out of the optical path and shutter opens 8, thereby taking a photograph. The luminous flux condensed by picture taking lens 1 is formed into an image on a primary image forming plane 16. The image then is reformed on image pickup element 14 through the action of relay lens 12 via field lens 9 and mirrors 10 and 11. Through optical low-pass filter 13, which is positioned in front of image pickup element 14, a specified spatial frequency component is eliminated. Variable aperture 1a is driven by stepping motor (not illustrated). The image formed on image pickup element 14 is converted to a charge signal and stored. The stored charge signal is output as an electrical signal, converted to a digital amount and stored as image data in a storage device (not illustrated) by a control circuit (not illustrated). The storage device is typically an image memory.

In the above-described conventional still camera, setting of the focus and the composition are performed while a photographer 15 is observing the image formed on focusing screen 3 before picture taking. Variable aperture 1a is stopped down by a control aperture value before picture taking is performed. However, when stopping down of variable aperture 1a is performed before picture taking, the image formed on focusing screen 3 becomes darker, thereby making it difficult to obtain good focusing and to determine the composition. Also, focusing screen 3 is not a perfect diffuser. Therefore, when the luminous flux is stopped down to a certain extent by variable aperture 1a, the luminous flux is not diffused by focusing screen 3, no light enters photometric element 7, and photometry becomes impossible. Therefore, in a conventional electronic still camera, a well-known "exposure measurement at open aperture method" is employed in which the variable aperture is opened during photometry.

The following is a description of the "exposure measurement at open aperture method". Photometry is performed with variable aperture 1a in a fully open position by photometric element 7 when the photographer presses the release button to a half-push position. A control aperture value is computed based on the results of a photometric measurement by photometric element 7. Then, when the release switch is turned ON by the release button being pressed to a full-push position, quick-return mirror 2 moves upwards in a mirror-up operation and, simultaneously, a stepping motor (not illustrated) operates to control variable aperture 1a, and variable aperture 1a is stopped down from the open position to a control aperture value which represents a control aperture position. Supply of power to the stepping motor continues during exposure to reliably maintain the control aperture position. When a predetermined time has been reached after the release button is pressed to the full-push position, shutter 8 opens for a specific shutter period and the luminous flux of the subject is reformed into an image on image-pickup element 14. Then, when an operation complete signal of shutter 8 is received, variable aperture 1a returns to the open position simultaneously with a mirror-down operation of mirror 2. This open position of variable aperture 1a is stably maintained by the supplying of power to the stepping motor.

In a conventional electronic still camera using the above-described "exposure measurement at open aperture method", aperture 1a is positioned in the optical path from picture taking lens 1 to photometric element 7 and eyepiece 6 via quick-return mirror 2. Therefore, when an attempt is made to stably maintain aperture 1a at an open value to obtain good focusing, composition setting or accurate photometry, power must be continuously supplied to the stepping motor since, if the supply of power to stepping motor is eliminated, there is a danger that the aperture diameter of aperture 1a will change from vibrations or external forces exerted on the camera. As a result of the need to continuously supply power to the stepping motor, electric power consumption of the stepping motor increases and battery power is wastefully consumed.

FIG. 2 is a timing chart illustrating the operational relationship between the release switch, the front blades of the shutter, and the variable aperture in a case where the control aperture value is relatively near the initial aperture value (fully open aperture value) at the time when the release switch becomes ON. As indicated by FIG. 2, shutter 8 opens aperture 1a when the front blades of shutter 8 passes over aperture 1a. T is the time from the release switch being turned ON (that is, the release button is pressed to the full-push position) to when shutter 8 begins to open. T is a constant. "Hatching" in FIG. 2 represents the time from the release switch being turned ON (aperture control start point at time T100) to when aperture control is completed at time T200. T1 represents the time from aperture control being completed to when shutter 8 begins to open at time T300 and, during time T1, a current for maintaining the control aperture value is supplied to the stepping motor.

FIG. 3 is a timing chart illustrating the operational relationship between the release switch, the front blades of the shutter, and the variable aperture in a case where the control aperture value is relatively far from the initial aperture value at the time of the release switch becomes ON. In FIG. 3, "hatching" represents the time from the release switch being turned ON (aperture control start point at time T100) to when aperture control is completed at time T200. T2 represents the time from aperture control being completed to when shutter 8 begins to open at time T300. During time T2, the current for maintaining the control aperture value is supplied to the stepping motor.

As illustrated in FIGS. 2 and 3, the time T, or "time lag", from the release button being pressed to when the shutter begins to open is constant. This time lag T is based on the time required to change the variable aperture 1a (which is at the fully open aperture value during the photometry operation) to the minimum aperture value. Therefore, in a conventional camera which requires aperture 1a to be set to the fully open aperture value during the photometry operation, a relatively long time lag T is set. Therefore, a high probability exists that a rare photograph opportunity will be missed.

Time lag T is constant. However, as indicated by T1 and T2 in FIGS. 2 and 3, respectively, and regardless of the size of the gap from the initial aperture value at the time of release (the fully open aperture value) to the control aperture value, there is an amount of time proportional to T1 and T2 from the completion of aperture control to the shutter opening operation in which power must be supplied to the stepping motor to stably maintain the control aperture value during this period. Also, power consumption is increased because the current required at this time is larger than when the stepping motor rotated.

FIG. 4 is a flow chart illustrating a processing sequence of a conventional electronic still camera during continuous shooting. The processing sequence begins with the pressing of the release button to a half-push position. In step S21, the control aperture value and the shutter period are computed based on brightness data measured by photometric element 7. In step S22, aperture 1a is driven to the computed control aperture value. When the release button is pressed to the full-push position, the system proceeds to step S23 where the shutter opening operation is implemented in accordance with the shutter period computed in step S21, and picture taking is performed. In step S24, a determination is made as to whether the release button has been pressed to the full-push position. If the release button was pressed to the full-push position, it is determined that continuous shooting is in progress. Therefore, the system moves to step S25 where the variable aperture 1a is moved to the open aperture value and, thereafter, the system returns to step S21. If the release button is not pressed to the full-push position in step S24, the process moves to step S26 where processing ends. As illustrated by FIG. 4, it is necessary to return variable aperture 1a to the fully open aperture value as the photographing of each frame is completed. When variable aperture 1a is stopped down (especially when aperture 1a is stopped down to the minimum aperture value), time is consumed in returning variable aperture 1a to the fully open aperture value. For this reason, time is required before the next photograph can be taken, the number of pictures taken in a unit of time drops, and the continuous shooting speed during continuous picture drops.

FIG. 5 is a timing chart illustrating the operational relationship between the release switch, variable aperture 1a, and shutter 8 during continuous shooting. In FIG. 5, T3 (hereafter referred to as "aperture control time") is the time required to drive variable aperture 1a to the control aperture position, and T4 is the time required to return variable aperture 1a from the control aperture position to the fully open aperture value and represents the aperture open time. As shown in FIGS. 4 and 5, during continuous shooting, variable aperture 1a must be returned to the fully open aperture value each time a frame is photographed. Therefore, continuous shooting at high speed is not possible.

FIG. 6 illustrates a light travel path from picture taking lens 1 to image pickup element 14, with the travel path illustrated as linearly extended for simplification of the illustration. Variable aperture 1a is stopped down in FIG. 6. The luminous flux enters the corner of primary image plane 16 and enters the corner of image pickup element 14. If the angle of the luminous flux which enters field lens 9 is angle Θ, angle Θ must be within a specified range for the luminous flux to enter relay lens 12.

FIG. 7 illustrates a camera with a picture taking lens 201 having a long focal length and an aperture 201a which is stopped down to a certain extent. In this situation, the luminous flux does not enter relay lens 12 because an exit pupil position of picture taking lens 201 is far from field lens 9 and because the angle of incidence Θ of the luminous flux which enters the corner of primary image forming plane 16 becomes large. Moreover, FIG. 8 illustrates a camera with a picture taking lens 301 having a short focal length and an aperture 301a which is stopped down to a certain extent. In this situation, the luminous flux does not enter relay lens 12 because an exit pupil position of picture taking lens 301 is near field lens 9 and because the angle of incidence Θ of the luminous flux which enters the corner of primary image forming plane 16 becomes small.

As illustrated by FIGS. 7 and 8, whether or not the luminous flux enters relay lens 12 changes according to the focal length and the exit pupil position of the picture taking lens and the aperture value. Specifically, luminous flux from the four corners of primary image forming plane 16 does not enter relay lens 12, but it does enter focusing screen 3 (which is at a conjugate position with primary image forming plane 16). Therefore, the photographer does not know that a portion of the luminous flux does not enter image pickup element 14. As a result, images which are darkened at the four corners of primary image forming plane 16 will be recorded without the photographer being aware of the darkened image.

SUMMARY OF THE INVENTION

Accordingly, it is an object of the present invention to eliminate the recording of a darkened image in a camera without the photographer's knowledge.

It is a further object of the present invention to reduce the amount of power required to operate a camera by reducing the amount of time in which power is required to be supplied to a motor for maintaining a variable aperture at a certain aperture value.

It is also an object of the present invention to reduce the average time required to drive a variable aperture between photographs in a camera.

It is a further object of the present invention to increase to photographic speed during continuous photograph shooting for a camera.

Additional objects and advantages of the present invention will be set forth in part in the description which follows and, in part, will be obvious from the description, or may be learned by practice of the invention.

Objects of the present invention are achieved by providing a camera comprising a picture taking lens which forms an image of the subject on an image forming plane; a relay lens which projects the image formed on the image forming plane; and a variable aperture positioned inside the relay lens.

Objects of the present invention are also achieved by providing a camera comprising a picture taking lens which passes light from the subject; a viewfinder optical system which has a viewfinder optical path and guides, along the viewfinder optical path, a portion of the light passing through the picture taking lens; a picture taking optical system which has a picture taking optical path and guides, along the picture taking optical path, a portion of the light passing through the picture taking lens, the portion of light guided by the picture taking optical system being a different portion of light than the portion of light guided by the viewfinder optical system; and a variable aperture which regulates the quantity of light passing through the variable aperture and is positioned to regulate the quantity of light guided by the picture taking optical system without regulating the quantity of light guided by the viewfinder optical system.

Objects of the present invention are further achieved by providing a camera in which the variable aperture is settable to a specific aperture size, the variable aperture having a maximum aperture size and a minimum aperture size, the camera further comprising a variable aperture control device which, after a photograph is taken, sets the aperture size of the variable aperture to an aperture size which is approximately midway between the maximum aperture size and the minimum aperture size.

Moveover, objects of the present invention are achieved by providing a camera which has a continuous picture taking mode and a variable aperture which is settable to a specific aperture size, the variable aperture having a maximum aperture size and a minimum aperture size, the camera further comprising a variable aperture control device which (a) sets the variable aperture to a first aperture size before a first photograph is taken when the camera is in the continuous picture taking mode; (b) determines, after the first photograph is taken, a new aperture size of the variable aperture for the next photograph; and, (c) drives, after the first photograph is taken, the variable aperture from the first aperture size directly to the new aperture size.

Further, objects of the present invention are achieved by providing a camera in which the variable aperture is settable to a specific aperture size, the camera further comprising a shutter which is released to take a photograph; a release initiation device which initiates release of the shutter when the photographer indicates that the shutter is to be released; a variable aperture control device which (a) determines a specific variable aperture size for a respective photograph which is to be taken, (b) drives the variable aperture to the specific variable aperture size after the initiation of the shutter release by the release initiation device, where t equals the time from the initiation of the shutter release by the release initiation device to the time when driving the variable aperture is complete and the variable aperture is set at the specific variable aperture size, and (c) makes the time t for each photograph constant by varying, in accordance with the variable aperture size, the time from the initiation of the shutter release by the release initiation device to the start of driving of the variable aperture; and a shutter control device which causes the shutter to be released after a specific time period $t_2$ elapses after the initiation of the shutter release by the release initiation device, the time period $t_2$ being greater than $t_1$.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 2 (prior art) is a timing chart illustrating an operational relationship between an aperture and shutter control in a conventional camera.

FIG. 3 (prior art) is a timing chart illustrating an operational relationship between an aperture and shutter control in a conventional camera.

FIG. 4 (prior art) is a flow chart illustrating a processing sequence of a conventional electronic still camera during continuous shooting.

FIG. 5 (prior art) is a timing chart illustrating an operational relationship between an aperture and shutter control during continuous shooting in a conventional electronic still camera.

FIG. 19 is a timing chart illustrating an operational relationship between an aperture and shutter control in a camera according to an embodiment of the present invention.

FIG. 20 is a timing chart illustrating an operational relationship between an aperture and shutter control in a camera according to an embodiment of the present invention.

DESCRIPTION OF THE PREFERRED EMBODIMENTS

Figure 1:
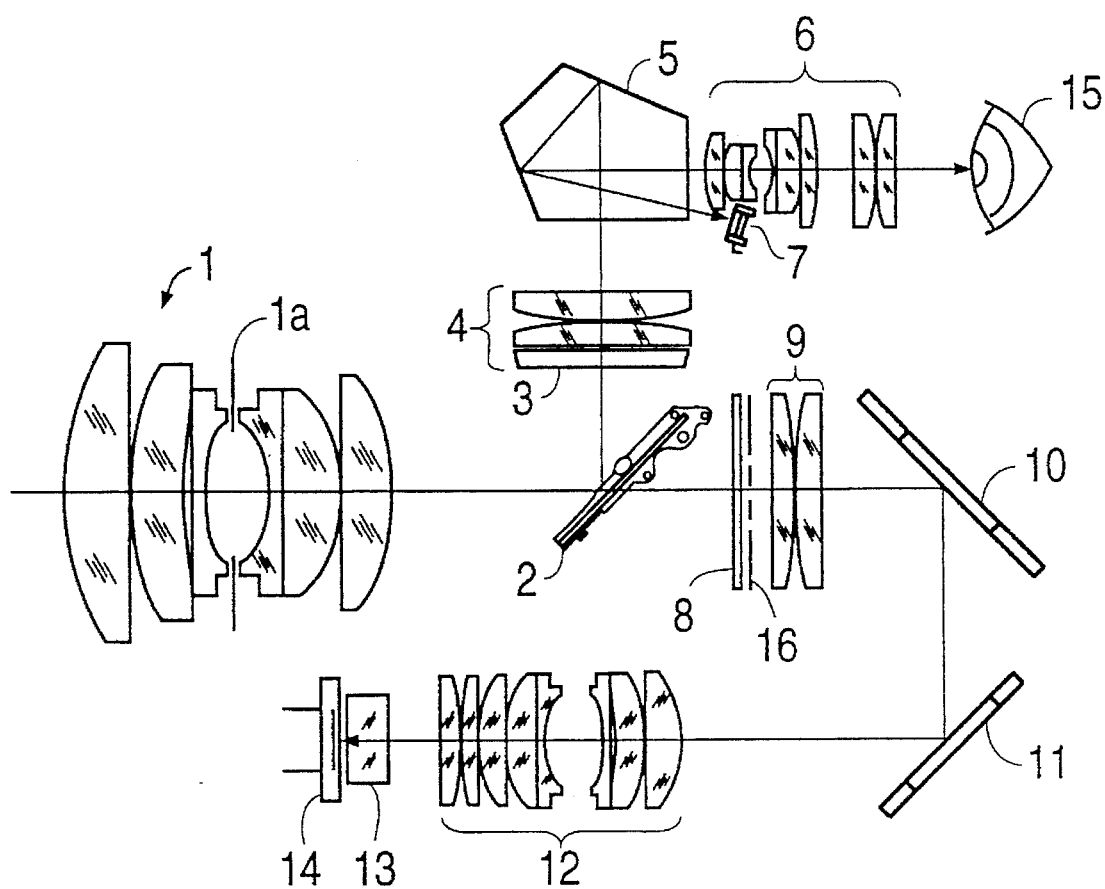
FIG. 1 (prior art) is a diagram illustrating a conventional electronic still camera.
Figure 6:
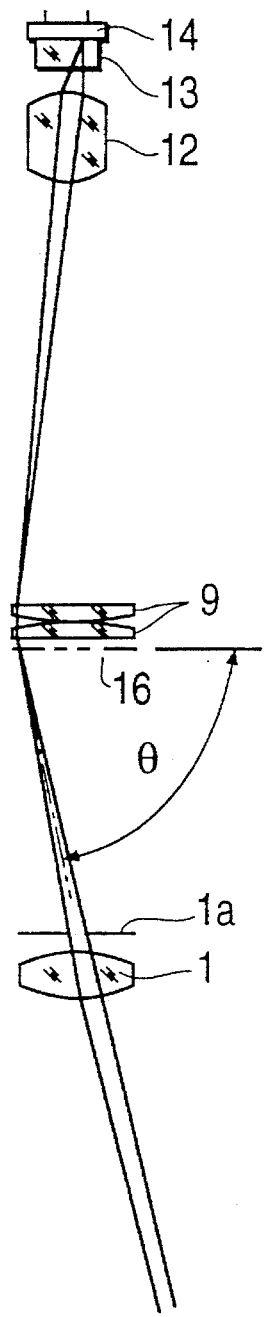
FIG. 6 (prior art) is a diagram illustrating the optical path of a conventional electronic still camera.

Reference will now be made in detail to the present preferred embodiments of the present invention, examples of which are illustrated in the accompanying drawings, wherein like reference numerals refer to like elements throughout.

Figure 9:
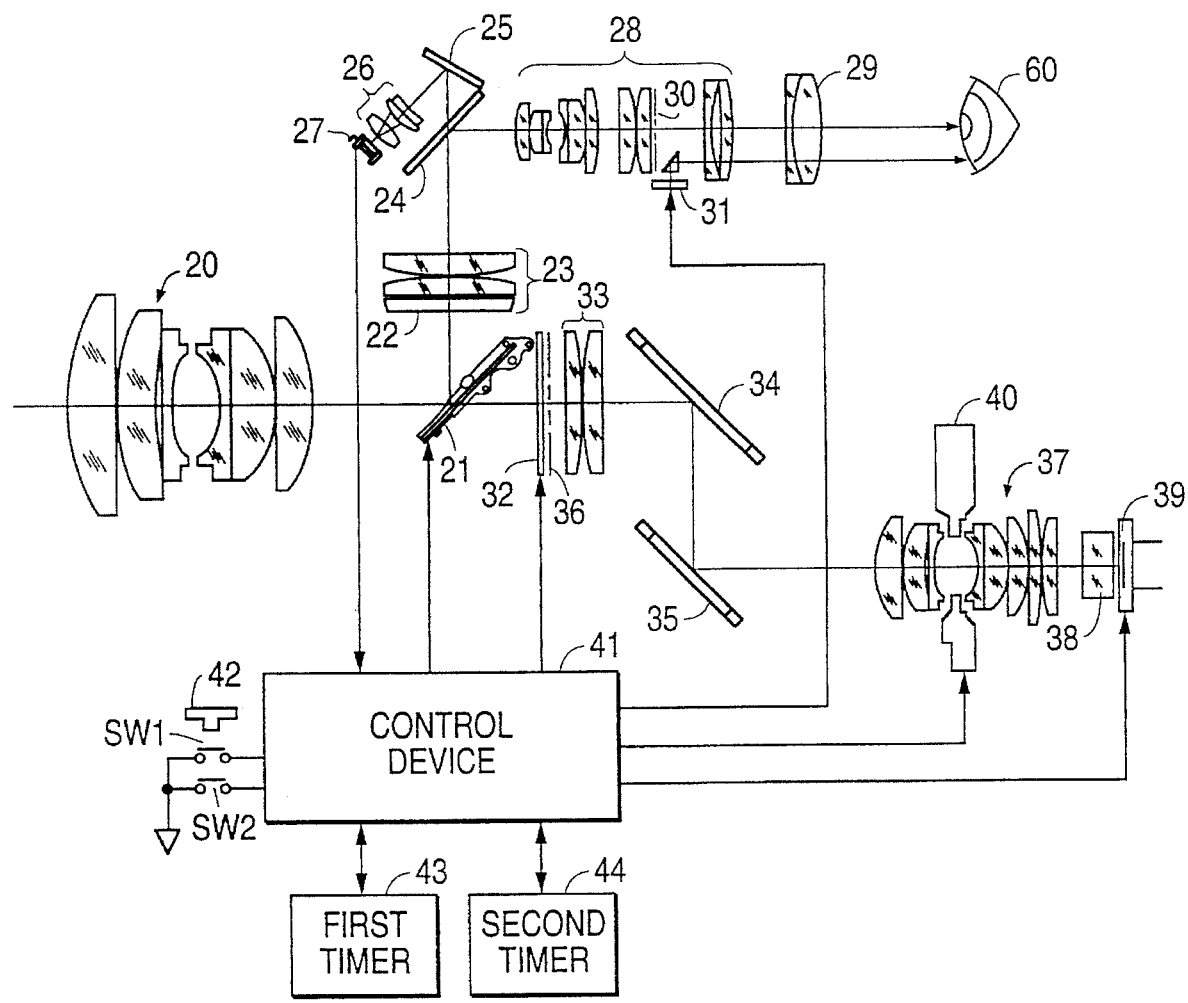
FIG. 9 is a diagram illustrating an electronic still camera according to an embodiment of the present invention.

FIG. 9 illustrates a configuration of a still camera according to an embodiment of the present invention. In this embodiment, a picture taking lens 20 does not have a built-in variable aperture. A quick-return mirror 21 is arranged behind picture taking lens 20. A focusing screen 22, a field lens 23, and a half-mirror 24 are arranged above quick-return mirror 21. A mirror 25 is positioned in the transmitted optical path of half-mirror 24, and a photometric element 27 is positioned in the reflected optical path of mirror 25 via a condenser lens 26. A viewfinder relay optical system 28 and an eyepiece 29 are arranged in the reflected optical path of half-mirror 24. A display element 31 is arranged in the vicinity of an image forming plane 30 on which an image of the subject inside the viewfinder relay optical system 28 is formed. Display element 31 displays, for example, the photometry mode and the shutter period. Such display is made inside the viewfinder. A viewfinder optical system comprises, for example, field lens 23, half-mirror 24, viewfinder relay optical system 28, and eyepiece 29. A shutter 32, a field lens 33, and mirrors 34 and 35 are arranged behind quick-return mirror 21. A primary image forming plane 36 is arranged behind shutter 32. Shutter 32 includes front blades (not illustrated) and rear blades (not illustrated). The operation of a shutter including front blades and rear blades is known in the art. An example of a shutter including front blades and rear blades is shown in U.S. patent application titled "CAMERA HAVING SHUTTER INSTRUMENTATION DEVICE", Ser. No. 08/200,322, to Hasuda, et al.

A relay optical system 37, an optical low-pass filter 38, and an image pickup element 39 are arranged in the reflected optical path of mirror 35. Image pickup element 39 is a well-known device and is typically a conventional CCD sensor; however, image pickup element 39 can be, for example, a conventional Metal Oxide Semiconductor (MOS) or a conventional Bucket Brigade Device (BBD). A variable aperture 40, which is driven by a stepping motor (not illustrated), is positioned in relay optical system 37. The minimum aperture area of variable aperture 40 is ½N of the maximum aperture area, and the variable aperture 40 has N aperture levels. A picture taking optical system comprises, for example, shutter 32, field lens 33, mirrors 34, 35, and relay optical system 37.

A release button 42 has a half-push position and a full-push position. Photometry is performed when release button 42 is pressed to the half-push position by a photographer 60 and a photograph is taken when release button 42 is pressed to the full-push position by photographer 60. A switch SW1 is turned ON when release button 42 is pressed to the half-push position and a switch SW2 is turned ON when release button 42 is pressed to the full-push position. Photometric element 27, switch SW1, switch SW2, a first timer 43 and a second timer 44 are connected to control device 41 which manages and controls the camera and comprises a microcomputer (not illustrated). Control signals are output from control device 41 to a driver (not illustrated) of quick-return mirror 21, a driver (not illustrated) of shutter 32, a stepping motor (not illustrated) of variable aperture 40 and image pickup element 39. Display data is output to display element 31.

First timer 43 sets the time T from when switch SW2 is turned ON to when the shutter begins to open. First timer 43 is started by the turning ON of switch SW2 and reset when time T elapses. Second timer 44 counts a delay time T5 (see FIGS. 19 and 20) until aperture control starts. Second timer 44 is started by the turning ON of switch SW2 and reset when the delay time T5 is reached. T5 is discussed below in relation to FIGS. 19 and 20 and is set in accordance with the control aperture value.

When picture taking lens 20 is facing the photograph subject with the electronic still camera in a picture taking mode, the luminous flux of the subject passes through picture taking lens 20, is reflected by quick-return mirror 21, and is formed into an image on a focusing screen 22. The light passes through half-mirror 24, from among the luminous flux which has been formed into an image on focusing screen 22, is reflected by mirror 25, condensed by condenser lens 26, and enters photometric element 27. On the other hand, the luminous flux which has been reflected by half-mirror 24 is reformed into an image on image forming plane 30 of viewfinder relay optical system 28. Then, the image which has been formed into an image on image forming plane 30 passes through eyepiece 29 and is observed by photographer 60. The display data which is displayed on the display element 31 also passes through eyepiece 29 and is observed by photographer 60. When release button 42 is pressed to the half-push position, switch SW1 becomes ON. When this ON signal is received by control device 41, exposure computation and setting of control aperture value and the shutter period are performed by control device 41 based on such data as the brightness data measured by photometric element 27. At this time, variable aperture 40 is stopped down to the N/2 level.

Figure 10:
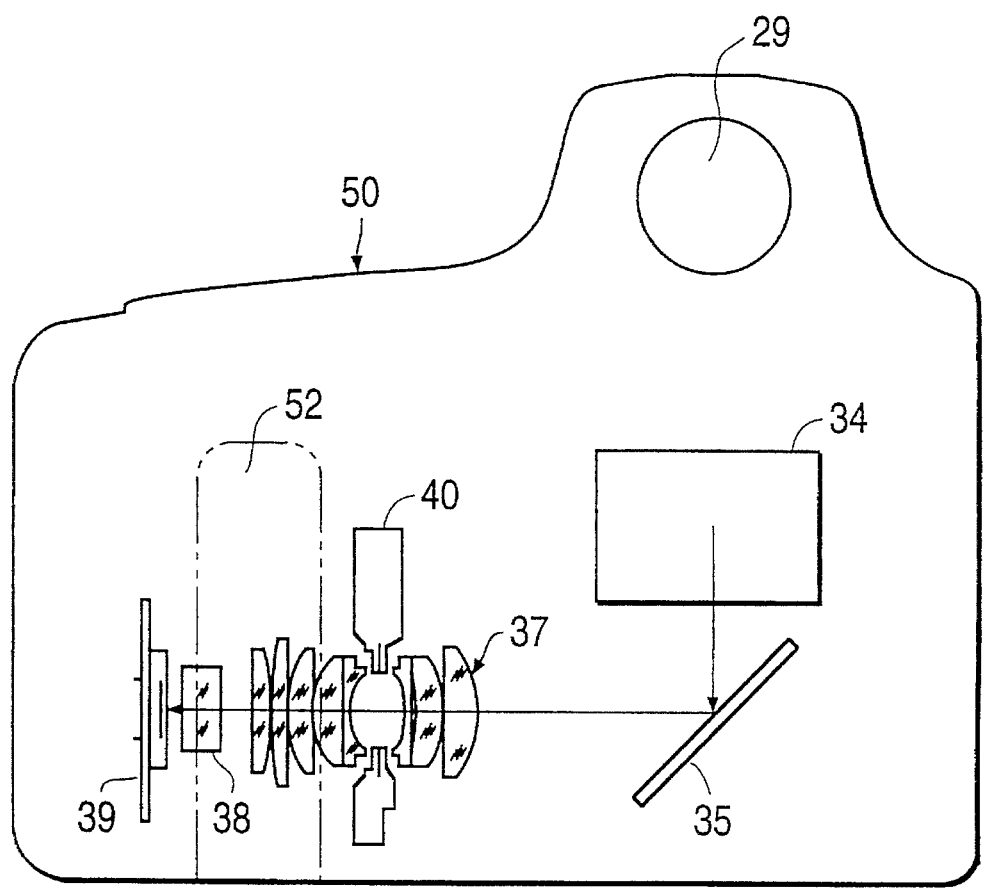
FIG. 10 is a diagram illustrating a relationship of a mirror and a relay optical system of a camera according to an embodiment of the present invention.
Figure 11:
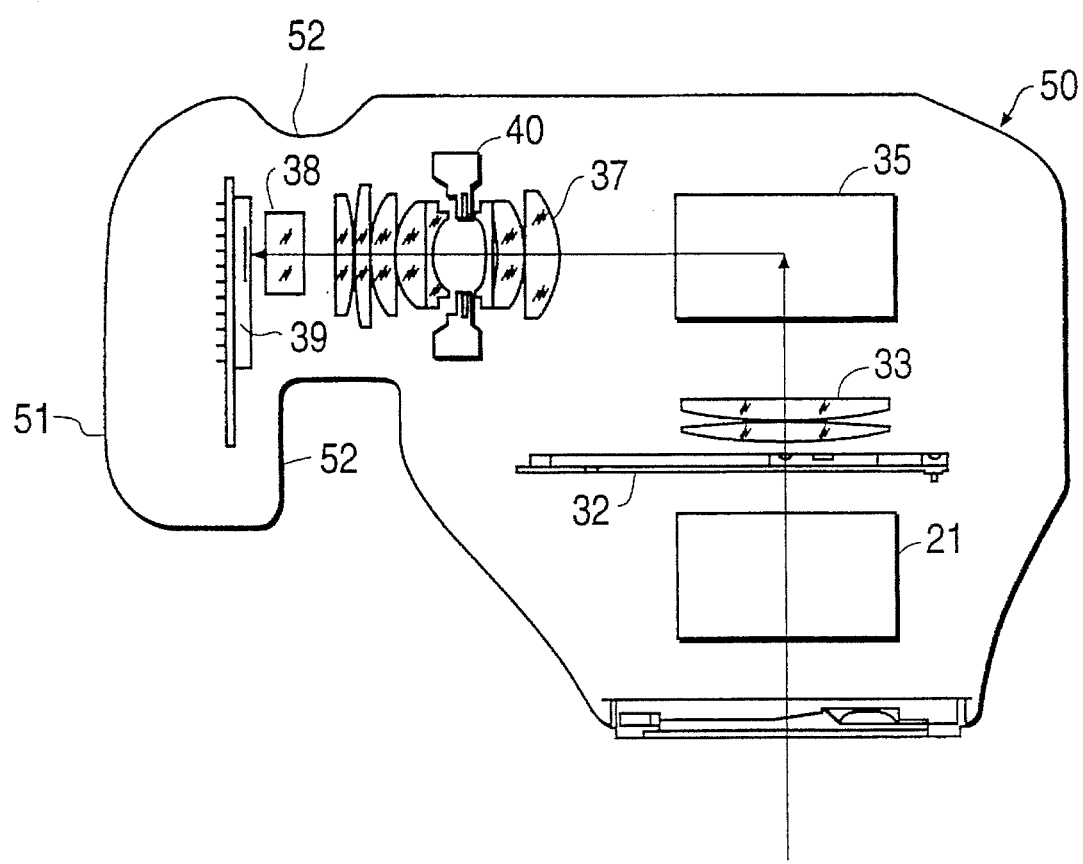
FIG. 11 is a diagram illustrating a relationship of a mirror and a relay optical system of a camera according to an embodiment of the present invention.

FIGS. 10 and 11 illustrate a camera body 50 having a concave section 52. As shown in FIG. 10, mirror 34 reflects downward the image of a subject formed on primary image forming plane 36 (FIG. 9) and, as shown in FIG. 11, mirror 35 reflects the image from mirror 34 to a grip portion 51 of camera body 50.

Figure 7:
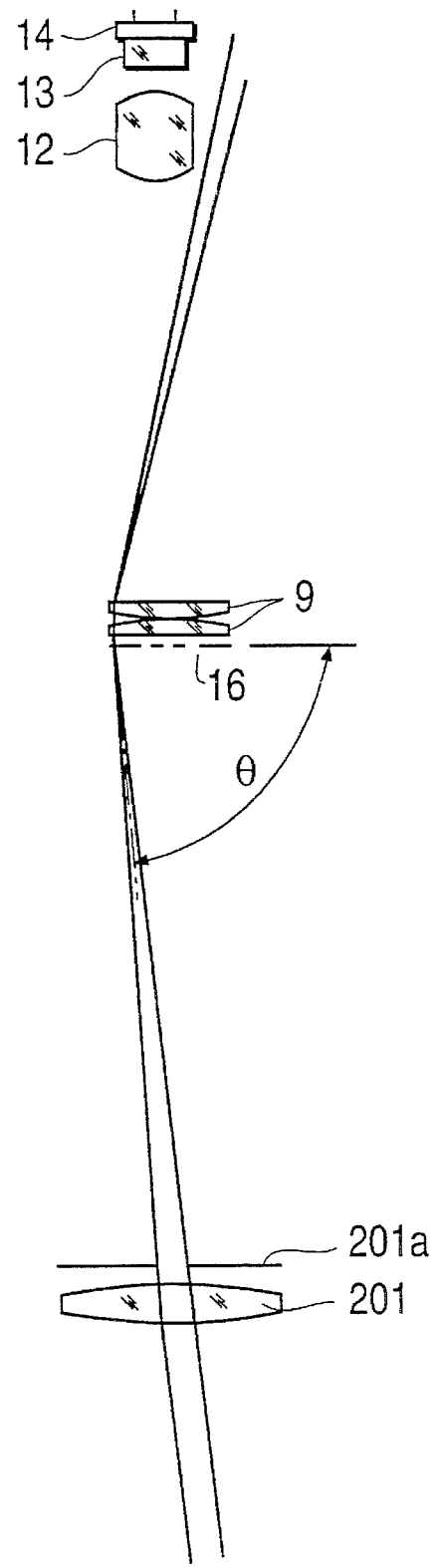
FIG. 7 (prior art) is a diagram illustrating an optical path of a conventional electronic still camera.
Figure 12:
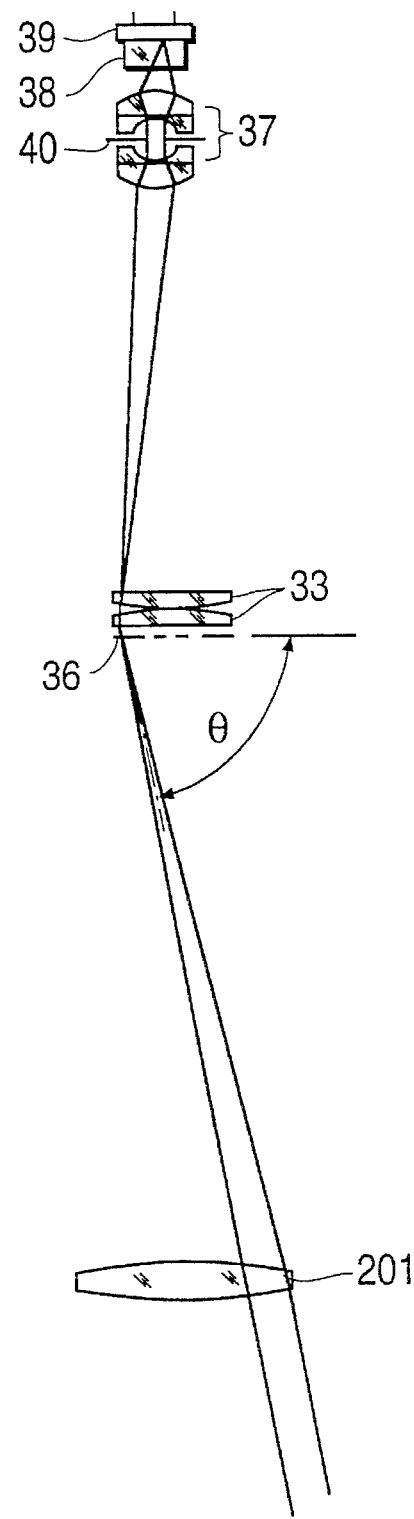
FIG. 12 is a diagram illustrating an optical path of an electronic still camera according to an embodiment of the present invention.

FIG. 12 illustrates an embodiment of the present invention which utilizes a picture taking lens 201. As illustrated in FIG. 12, aperture 40 is arranged in the relay optical system 37 and stops down the luminous flux which has entered relay optical system 37. The angle of incidence Θ of the luminous flux with respect to field lens 33 does not become too large, and it becomes possible to obtain an image in which there are no shadows, even in the corners. The embodiment of the present invention as illustrated in FIG. 12 can be contrasted to the conventional system illustrated in FIG. 7 in which corner luminous flux can not enter the image pickup element as a result of aperture 201a being arranged in picture taking lens 201. Aperture 201a is not included in the embodiment of the present invention illustrated in FIG. 12.

Figure 8:
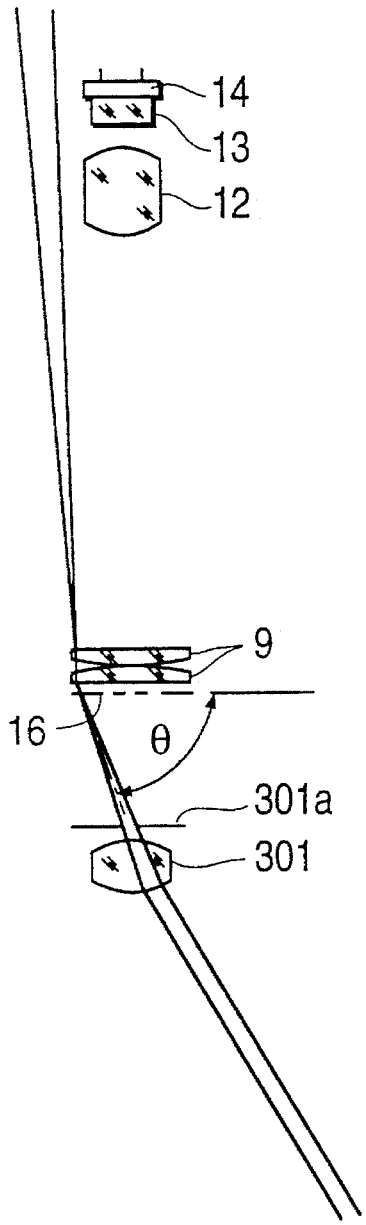
FIG. 8 (prior art) is a diagram illustrating an optical path of a conventional electronic still camera.
Figure 13:
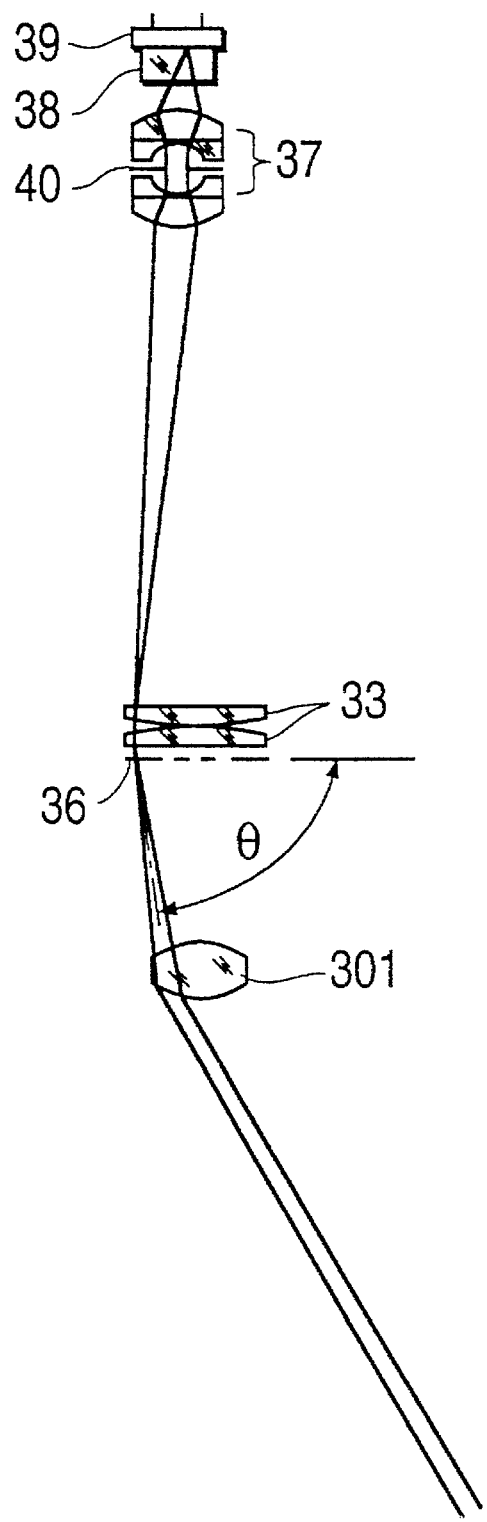
FIG. 13 is a diagram illustrating an optical path of a camera according to an embodiment of the present invention.

FIG. 13 illustrates an embodiment of the present invention which utilizes picture taking lens 301. As illustrated in FIG. 13, aperture 40 is arranged in the relay optical system 37 and stops down the luminous flux which has entered relay optical system 37. The angle of incidence Θ of the luminous flux with respect to field lens 33 does not become too small, and the luminous flux which enters the corner of primary image forming plane 36 enters image pickup element 39 without shadowing. The embodiment of the present invention as illustrated in FIG. 13 can be contrasted to the conventional system illustrated in FIG. 8 in which corner luminous flux can not enter the image pickup element as a result of aperture 301a being arranged in picture taking lens 301. Aperture 301a is not included in the embodiment of the present invention illustrated in FIG. 13.

By eliminating the aperture (201a, 301a) of the picture taking lens (201, 301) and instead using aperture 40, the shadows which were caused in the four corners in the conventional camera can be controlled to a certain extent, even if a picture taking lens with a long or a short focal length is used. As illustrated in FIGS. 12 and 13, when a photograph is taken, variable aperture 40 is in relay optical system 37. Thus, the photometry operation will not be affected regardless of the aperture diameter of variable aperture 40 and regardless of whether the aperture diameter of variable aperture 40 has remained in an unstable condition due to a lack of power being supplied to the stepping motor.

Figure 14:
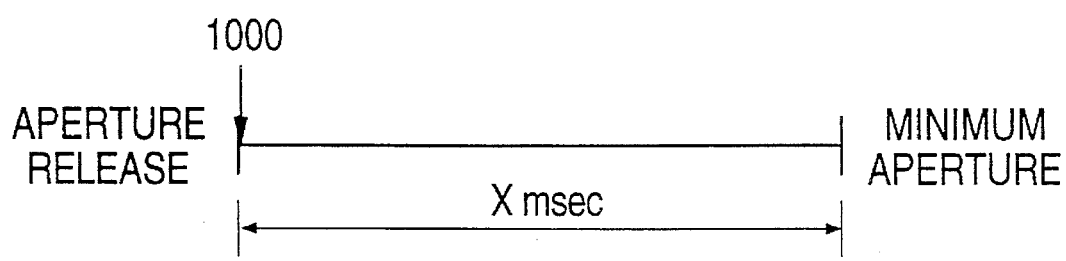
FIG. 14 is a timing chart illustrating an aperture control condition where the initial value of a variable aperture is set to an open value, according to an embodiment of the present invention.
Figure 15:
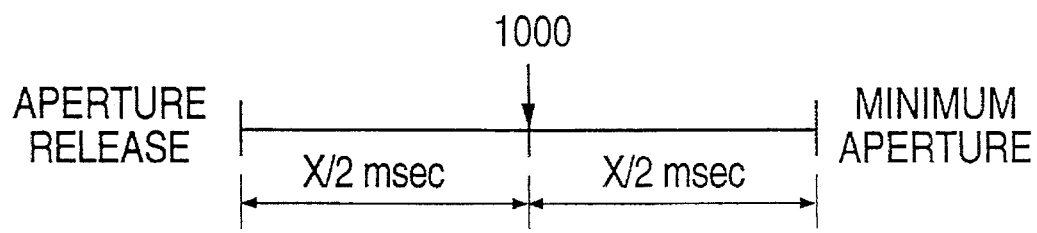
FIG. 15 is a timing chart illustrating an aperture control mode according to an embodiment of the present invention.

The completion of photometry is displayed on display element 31 and, when having noticed the completion of photometry, the photographer presses release button 42 to the full-push position and switch SW2 becomes ON. When SW2 becomes ON, control device 41 outputs drive signals to the driver of quick-return mirror 21 and quick-return mirror 21 moves out of the optical path. When switch SW2 becomes ON, control device 41 also outputs drive signals to the stepping motor of variable aperture 40 according to the aperture control value to drive the stepping motor and drive variable aperture 40 (which is at the central value of the N/2 level) to the control aperture value. In this manner, even in the case where variable aperture 40 is stopped down to the minimum aperture value, the aperture operation time can be cut in half compared to conventional stopping down procedures from the fully open aperture value. That is, as shown in FIG. 14, when the initial aperture value 1000 is set to the fully open aperture value, X msec is needed to stop down variable aperture 40 from the fully open aperture value to the minimum aperture value. However, as shown in FIG. 15, by setting the initial value 1000 of variable aperture 40 to a position in the center of the fully open aperture value and the minimum aperture value, the time required for driving variable aperture 40 from this central position to the minimum aperture value can be considered to be X/2 msec. Therefore, the time lag of the camera can be reduced. Moreover, after variable aperture 40 is driven to the control aperture value, power is supplied to the stepping motor and variable aperture 40 is maintained at the control aperture value. When a specified period of time elapses after variable aperture 40 is driven to the control aperture value, drive signals are output from control device 41 to the driver of shutter 32 and a shutter opening operation is performed in accordance with the computed shutter period. In addition, the luminous flux which is condensed by picture taking lens 20 is formed into an image on primary image forming plane 36, and an image passes through field lens 33, mirrors 34 and 35, and variable aperture 40 and is formed into an image on image pickup element 39 by relay optical system 37. The light input which formed into an image on image pickup element 39 is converted to a charge signal and stored in a conventional manner. The stored charge signal is read by a clock signal (not illustrated) which is output from control device 41 and synchronized with the timing of read signals (not illustrated) from image pickup element 39. After being read, the charge signal is converted to a digital amount. The digital amount is stored in an image memory. Then, quick-return mirror 21 moves down with the completion of the shutter operation and, simultaneously with the down movement of quick-return mirror 21, variable aperture 40 is automatically returned from the control aperture value to the initial aperture value (that is, to the central position "N/2" of the fully open aperture value and the minimum aperture value). Shutter 32 is then charged up.

During a single picture taking mode in which only one frame is photographed each time release button 42 is pressed, variable aperture 40 returns to the initial aperture value of N/2 each time a picture taking operation is completed. Also, variable aperture 40 should be set to the initial aperture value at the initiation of picture taking, that is, before the first photograph is taken after the camera is turned ON.

During a continuous shooting mode in which picture taking is performed continuously for the period during which the release button is pressed, operation is as follows, according to an embodiment of the present invention. First, when luminous flux enters photometric element 27 each time quick-return mirror 21 returns, new photometry is performed, wherein a new shutter period and control aperture value are computed. Then, variable aperture 40 is driven directly from the control aperture value during the previous picture taking operation to a new control aperture value.

Figure 16:
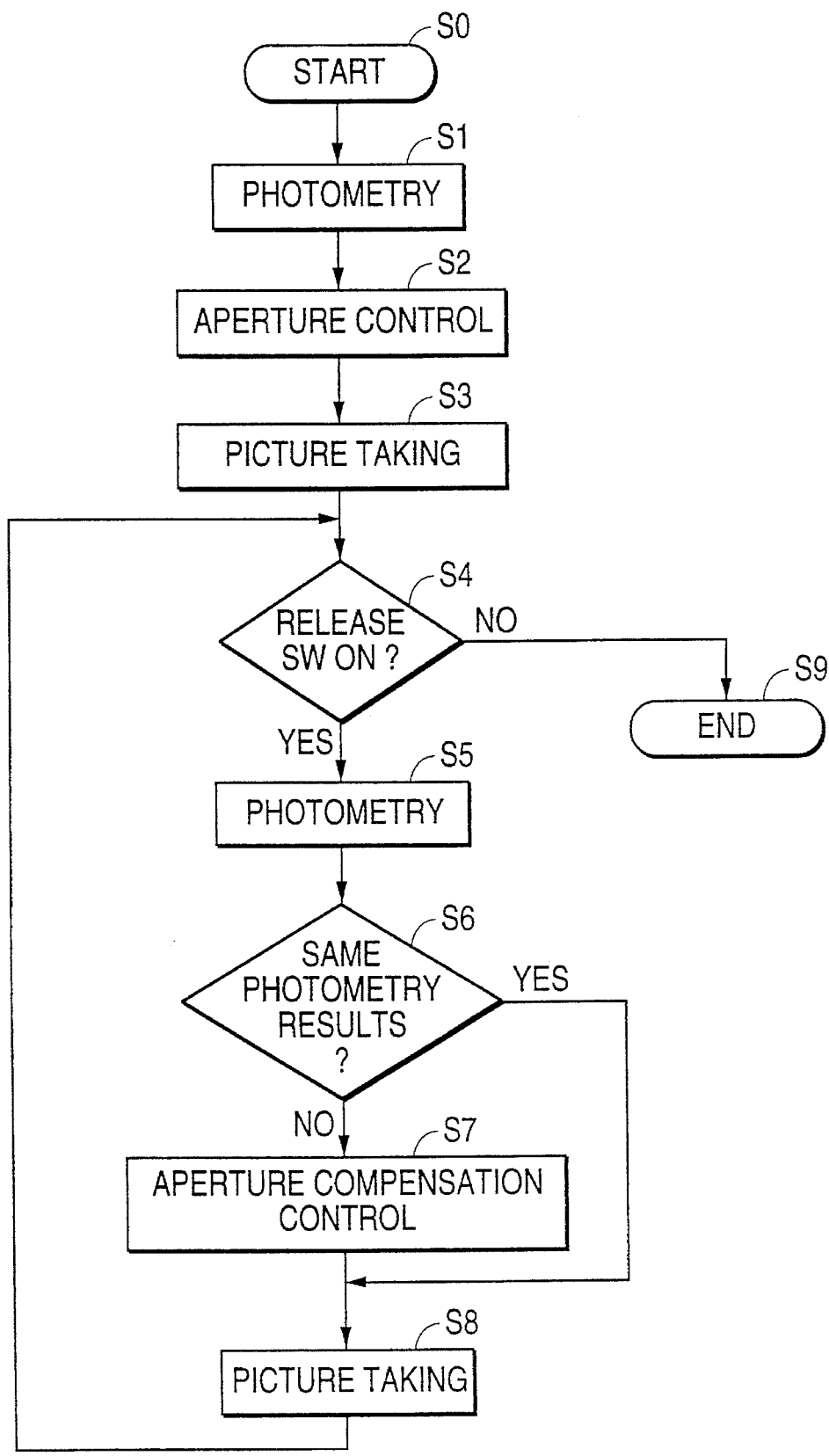
FIG. 16 is a flow chart illustrating a processing sequence of a control device of a camera according to an embodiment of the present invention.

FIG. 16 is a flow chart illustrating a processing sequence of control device 41 during continuous shooting mode, according to an embodiment of the present invention. The process starts in step S0 by pressing release button 42 to the half-push position. In step S1, exposure computation is performed and the control aperture value and the shutter period are computed based on data such as the brightness measured by photometric element 27. The process then moves to step S2 where variable aperture 40 is driven to the control aperture value computed in step S1. When release button 42 is pushed to the full-push position, the process moves to step S3 where the shutter opening operation is performed according to the shutter period computed in step S1, and picture taking is performed. Then, in step S4, a determination is made as to whether the release button 42 is in the full-push position. If release button 42 is not in the full-push position, processing is completed and the process ends in step S9. On the other hand, if it is determined in step S4 that release button 42 is in the full-push position, it is determined that the camera is in a continuous shooting mode and the process moves to step S5 where the subject brightness is again computed by photometric element 27, exposure compensation is again performed, and a new control aperture value and shutter period are computed. The process then moves to step S6 where a comparison is made as to whether the computed control aperture value is equal to the previous control aperture value. If it is determined in step S6 that the computed control aperture value and the previous control aperture value are not equal, the process moves to step S7 where variable aperture 40 is driven and controlled only by the value of the difference between the previous aperture control value and the current control aperture value. The process then moves to step S8 where the shutter opening operation is performed in accordance with the shutter period computed in step S5, picture taking is performed, and the process returns to step S4. On the other hand, if it is determined in step S6 that the current control aperture value and the previous control aperture value are equal, the process skips step S7 and proceeds to step S8.

Figure 17A:
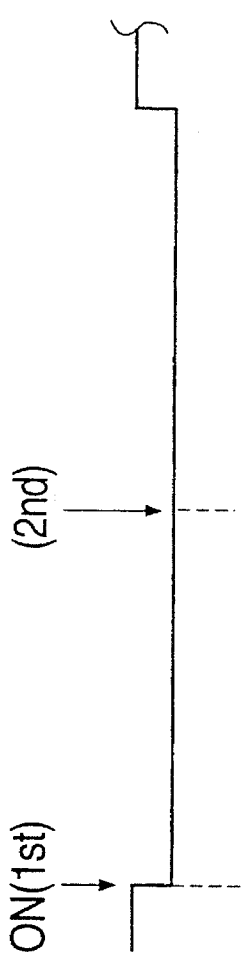
FIG. 17 is a timing chart illustrating an operational relationship between an aperture and shutter control during continuous shooting in a camera according to an embodiment of the present invention.
Figure 17B:
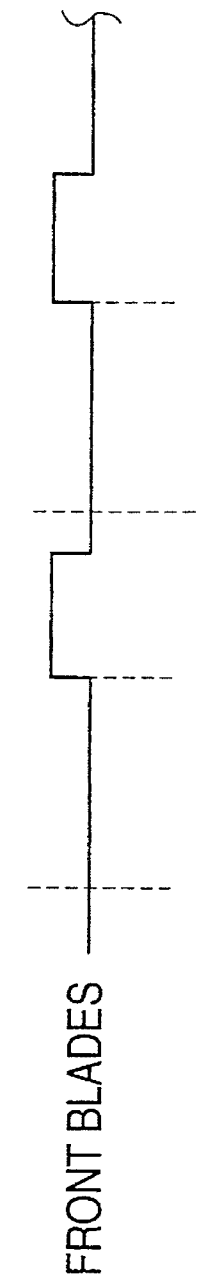
Figure 17C:
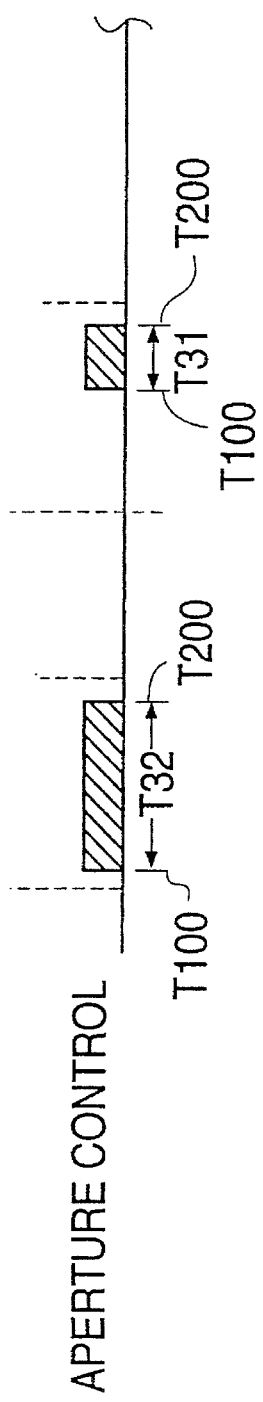

FIG. 17 is timing chart illustrating an operational relationship between release switch 42, variable aperture 40 and shutter 32 during continuous shooting mode. During continuous shooting, according to the present embodiment of the present invention, variable aperture 40 is only moved by the amount of the difference between the control aperture value during the previous picture taking and the new control value. As indicated by FIG. 17, there is a strong possibility that the aperture control time T31 (see FIG. 17) from aperture control start print T100 to when aperture control is completed at time T200 during continuous shooting can be made shorter than the aperture control time T32 (see FIG. 17). Since the subject brightness almost never changes much during continuous shooting, the difference in the control aperture value is generally small and, therefore, variable aperture 40 only needs to be moved for a short time. Also, although a conventional camera as illustrated in FIG. 5 requires a variable aperture to be returned to the fully open aperture value with each frame photographed, according to the present embodiment of the present invention, it is not necessary to return variable aperture 40 to the fully open aperture value with each frame photographed. Therefore, according to the present embodiment of the present invention, higher speed continuous shooting is possible as compared to convention cameras.

Figure 18:
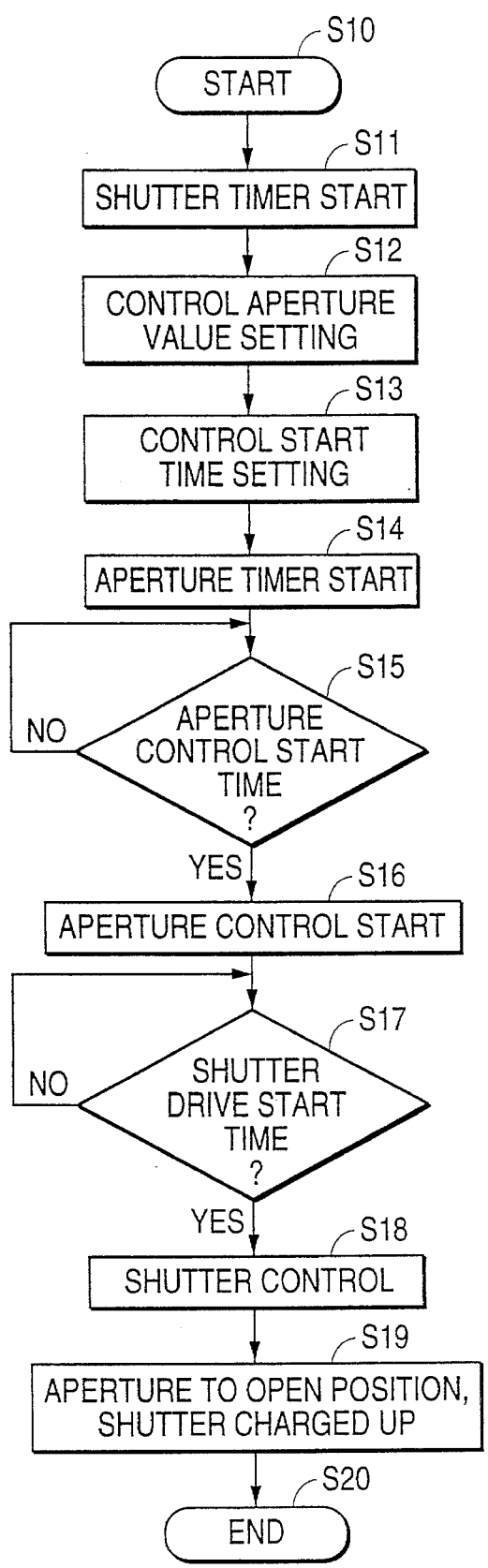
FIG. 18 is a flow chart illustrating an operational relationship between an aperture and shutter control in a camera according to an embodiment of the present invention.

FIGS. 18–20 illustrate camera operation when picture taking is performed by keeping constant the time lag from the time when the release button is pressed to the full-push position to the time when the shutter begins to open, according to an embodiment of the present invention. As illustrated in FIG. 18, the process starts in step S10 when release button 42 is pressed to the full-push position. In step S11, first timer 43 is started in response to the ON signal of switch SW2. In step S12, exposure computation is performed and the control aperture value and shutter period are determined based on data such as the brightness data measured by photometric element 27. In step S13, the delay time T5 from release button 42 being pressed to the start of aperture control activation is computed by:

$$T5=T-(T3+t)$$

based on the predetermined control aperture value (see FIGS. 19 and 20), and this time T5 is set as the activation start time of variable aperture 40. Then, in step S14, the second timer 44 is started. In step S15, the value of the second timer 44 and the computed delay time T5 for aperture control start are compared, and a determination is made as to whether the aperture control start time has been reached. When it has been determined that the aperture control start time has been reached, the process moves to step S16 and the variable aperture 40 is driven to the control aperture value. That is, when the aperture control start delay time T5 has elapsed, a number of pulses which corresponds to the control aperture value is sent by a pulse distribution circuit (not illustrated) which has a built-in control device 41. By adding these pulses to the stepping motor of variable aperture 40, the stepping motor is driven and variable aperture 40 is stopped down from the initial aperture value to the control aperture value.

In step S17, a determination is made as to whether the shutter drive start delay time T, which has been set in advance, has elapsed according to first timer 43. If it is determined that the shutter drive start delay time T has elapsed, the process moves to step S18 and shutter 32 is operated. That is, when the shutter drive start delay time T from when the release switch SW2 came ON has elapsed, drive signals are output by control device 41 to the driver of shutter 32. These drive signals cause the rear blades of shutter 32 to move after the delay time, wherein the delay time corresponds to the computed shutter period. The drive signals cause the front blades of shutter 32 to begin to move and the luminous flux of the subject is reformed into an image on the light-receiving plane of the image pickup element 39. Then, when signals which accompany the completion of the movement of the rear blades of shutter 32 are output by control device 41, a mirror down operation is performed and, at the same time, variable aperture 40 is automatically returned from the control aperture value to the initial aperture value and the shutter 32 is charged up (step S19).

FIG. 19 is a timing diagram which illustrates an operational relationship between release switch, variable aperture 40, and the front blades of shutter 32 where the control time of the aperture value is short. As is clear from FIG. 19, because the aperture control time T3 from aperture control start point at time T100 to when aperture control is completed at time T200, is short, the delay time T5 from the time of the release operation to the time of the start of aperture control activation becomes longer. It is not necessary to supply power to the stepping motor during this delay time T5. Moreover, the time t from the completion of aperture control to the start T300 of the shutter opening operation is constant, power is supplied to the stepping motor during this time t, and the variable aperture is reliably maintained at the control aperture value.

FIG. 20 is a timing diagram which illustrates an operational relationship between the release switch, variable aperture 40, and the front blades of shutter 32 in the case where the control time of the aperture value is long. As is clear from FIG. 20, because the aperture control time T3 is longer than in the case of FIG. 19, the delay time T5 of the start of that aperture control is shorter than in the case of FIG. 19. In this case as well, it is not necessary to supply power to the stepping motor during this delay time T5. However, during time t, power is supplied to the stepping motor in the same manner as the case of FIG. 19. As is clear from FIGS. 19 and 20, the control end time of variable aperture 40 is the same even if the time required for aperture control is variable. Thus, even in the case where the time lag T is constant, a long time t is not required from the completion of control of the variable aperture. According to the embodiments of the present invention, a camera is provided which eliminates the recording of images having unexpected shadowing at the perimeter of the recorded image. Also, a variable aperture is positioned in the optical path which guides the light of the subject to the image pickup element. That is, variable aperture 40 is positioned in the relay optical system. Therefore, there is no effect on photometry even if the variable aperture is stopped down during the photometry operation. Also, the image of the subject, which is observed through the viewfinder, has a sufficient quantity of light and there is no obstruction to focusing and the setting of the composition. In the case where a stepping motor is used to drive the variable aperture, there is no longer a need to supply power during photometry and power consumption can be further reduced.

According to the embodiment of the present invention as illustrated in FIG. 15, after a photograph is taken, the variable aperture is automatically returned to the aperture value in the center of the fully open aperture value and the minimum aperture value and then is driven from this central position to the control aperture value during the next picture taking. By automatically returning the variable aperture to an initial aperture value or a central value which is between the fully open aperture value of the variable aperture and the minimum aperture value (stop down condition), the drive amount to drive the variable aperture to the control aperture value becomes smaller and the power supply time to an aperture drive device is shortened. Therefore, even in the case where the variable aperture is stopped down to the minimum aperture value, the drive amount of variable aperture 40 can be cut to half in a camera according to an embodiment of the present invention as compared to a conventional camera. Additionally, the time during which power is supplied to the stepping motor can be reduced according to this embodiment of the present invention as compared to a conventional camera. Also, the time lag until picture taking can be reduced according to this embodiment of the present invention as compared to a conventional camera.

According to the embodiment of the present invention as illustrated in FIG. 17, in continuous shooting mode, variable aperture 40 is driven directly from the control aperture value of the previous picture taking to the new control aperture value without the photographer returning the variable aperture to the fully open aperture value at the completion of each picture taking. Therefore, a shorter time is required for aperture control and, as a result, the number of frames photographed per unit time increases and the camera's continuous shooting speed can be increased.

According to the embodiments of the present invention as illustrated in FIGS. 10 and 11, the luminous flux is passed through picture taking lens 20 after quick-return mirror 21 performs the up operation, reflected downward by mirror 34 and then reflected to the grip portion 51 of camera body 50 by mirror 35. Therefore, image pickup element 39 and its peripheral circuits (not illustrated) can be accommodated inside grip portion 51 and the camera can be made more compact. Moreover, by bending the luminous flux downward using mirror 34, grip portion 51 and a concave section 52 (into which the photographer's finger is inserted) may be positioned below eyepiece 29, thereby providing a camera which is easy to grip in the right hand and which may be held or stabilized with the right arm. Thus, the camera can be held against the photographer's body for stability.

The present invention is not intended to be limited to the above-described configurations and embodiments. For example, in the above-described embodiments of the present invention, the initial aperture value of the aperture is set to a value halfway between the maximum aperture value and the minimum aperture value. However, if there is no need to attempt to shorten the shutter drive start lag time, the initial value of the aperture may also be set to the maximum aperture value or the minimum aperture value. Moreover, the aperture may be driven by an actuator other than a stepping motor. Also, the aperture control method is also not intended to be limited to the method described herein. Further, the embodiments of the present invention are described in relation to an electronic still camera, but the present invention is also applicable to other types of camera, such as a hybrid camera which is equipped with an optical system that forms the image of a subject on silver salt film and an optical system that forms the image of the subject on an image pickup element.

According to the embodiment of the present invention as illustrated in FIGS. 18–20, the start time of variable aperture control varies according to the control aperture value so that the time from the turning ON of the release switch to the completion of aperture control becomes approximately fixed. Shutter 32 opens after this fixed, or constant, time period. Therefore, the time lag from the turning ON of the release switch to the start of shutter drive becomes constant. The time from when aperture control is completed to when the shutter opening operation starts can be held to a minimum and the amount of electrical power consumed during this period can also be held to a minimum. Therefore, the time from the completion of aperture control to when the shutter opening operation starts is always at a minimum and the power consumed during that time can be held to a minimum.

According to the embodiments of the present invention, controlling the quantity of light using variable aperture 40 makes a conventional aperture positioned inside the picture taking lens unnecessary. In a conventional camera, the aperture inside the picture taking lens is stopped down and the luminous flux does reach relay lens 14. In this manner, a darkened image is recorded without the photographer's knowledge. The embodiments of the present invention eliminate this problem by not positioning the aperture in the picture taking lens. According to the embodiments of the present invention, variable aperture 40 only regulates the quantity of light of the picture taking optical system, so variable aperture 40 does not affect photometry even if variable aperture 40 is stopped down during the photometric operation. Photometry can be performed without supplying power to the variable aperture driver and the required current can be reduced. According to the embodiments of the present invention, the quantity of light of the luminous flux of the subject in the viewfinder optical system is sufficient for focusing and composition setting.

According to the embodiments of the present invention, the drive amount to drive variable aperture 40 from the initial aperture value to the control aperture value becomes smaller, and the time during which power is supplied to the variable aperture driver is also shortened. Therefore, the required current can be reduced and the time lag until picture taking can be shortened.

According to the embodiments of the present invention, a release initiation device acts to initiate release of the shutter when the photographer indicates that the shutter is to be released. In the embodiments of the present invention discussed above, the release initiation device is the release button, whereby the photographer presses the release button to initiate release of the shutter. However, the release initiation device is not intended to be limited to a release button. For example, a camera could have a wink release device which initiates the shutter release upon the wink of a photographer. Thus, the wink release device would operate as a release initiation device.

According to the embodiments of the present invention, variable aperture 40 is positioned inside relay lens 12. A viewfinder optical system guides the luminous flux of the subject passed through picture taking lens 20 to viewfinder 29. A picture taking optical system guides the luminous flux of the subject passed through the picture taking lens 20 to the image pickup element 39. Variable aperture 40 regulates the quantity of light of the luminous flux of the subject. An aperture drive device drives variable aperture 40 to the control aperture value. Control device 41a acts as the aperture drive device. Variable aperture 40 is arranged so that only the quantity of light of the luminous flux of the subject is regulated.

According to an embodiment of the present invention, the picture taking optical system includes relay optical system 37 which reforms, on image pickup element 39, the image of the subject which has passed through picture taking lens 20 and has been formed on primary image forming plane 36. Variable aperture 40 can be positioned in the optical path between primary image forming plane 36 and image pickup element 39. The aperture drive device is configured so that variable aperture 40 is initially set to an aperture value which is between the fully open aperture value and the minimum aperture value after the completion of picture taking. The aperture drive device is configured so that, during continuous shooting and after the completion of picture taking, variable aperture 40 is moved directly from the control aperture value at the completion of picture taking to a new control aperture value. Shutter 31 is opened after a specified period of time has elapsed from the time of the release button being fully-pressed, and the aperture drive device operates so that the time from the release button being pressed to the full-push position to the start of the driving of variable aperture 40 is varied according to the control aperture value. Therefore, the time from the release button being pressed to the full-push position to when variable aperture 40 is controlled to the control aperture value is approximately constant.

A picture taking optical system is described above, in relation to FIG. 9, as comprising shutter 32, field lens 33, mirrors 34, 35, and relay optical system 37. However, a picture taking optical system is not intended to be so limiting as to require each of these elements. There are many different obvious combinations of elements for forming a picture taking optical system. Similarly, a viewfinder optical system was described above, in relation to FIG. 9, as comprising field lens 23, half-mirror 24, viewfinder relay optical system 28, and eyepiece 29. However, a viewfinder optical system is not intended to be so limiting as to require each of these elements. There are many different obvious combinations of elements for forming a viewfinder optical system.

Although a few preferred embodiments of the present invention have been shown and described, it would be appreciated by those skilled in the art that changes may be made in these embodiments without departing from the principles and spirit if the invention, the scope of which is defined in the claims and their equivalents.

What is claimed is:

1. An optical device which forms an image of a subject on an image recording medium, the optical device comprising:

picture taking lens passing light from the subject and forming an image of the subject on an image forming plan;

viewfinder optical system having a viewfinder optical path and guiding, along the viewfinder optical path, light passing through the picture taking lens;

picture taking optical system having a picture taking optical path and guiding, along the picture taking optical path, light passing through the picture taking lens, the picture taking optical path being a different optical path than the viewfinder optical path and extending from the image forming plane to the image recording medium, the picture taking optical system receiving the image formed on the image forming plane and projecting the image to the image recording medium; and variable aperture regulating the quantity of light passing through the variable aperture and positioned to regulate the quantity of light guided by the picture taking optical system without regulating the quantity of light guided by the viewfinder optical system, the variable aperture being positioned in the picture taking optical path between the image forming plane and the image recording medium.

2. An optical device as in claim 1, wherein the picture taking optical system includes a relay optical system and the variable aperture is in the relay optical system.

3. An optical device as in claim 2, wherein the optical device is a camera and the variable aperture is settable to a specific aperture size, the variable aperture having a maximum aperture size and a minimum aperture size, the optical device further comprising a variable aperture control device which, after a photograph is taken, sets the aperture size of the variable aperture to an aperture size which is approximately midway between the maximum aperture size and the minimum aperture size.

4. An optical device as in claim 3, wherein the variable aperture control device sets the aperture size of the variable aperture to an aperture size which is approximately midway between the maximum aperture size and the minimum aperture size before the first photograph is taken after the optical device is turned ON.

5. An optical device as in claim 1, wherein the optical device is a camera and the variable aperture is settable to a specific aperture size, the variable aperture having a maximum aperture size and a minimum aperture size, the optical device further comprising a variable aperture control device which, after a photograph is taken, sets the aperture size of the variable aperture to an aperture size which is approximately midway between the maximum aperture size and the minimum aperture size.

6. An optical device as in claim 5, wherein the variable aperture control device sets the aperture size of the variable aperture to an aperture size which is approximately midway between the maximum aperture size and the minimum aperture size before the first photograph is taken after the optical device is turned ON.

7. An optical device as in claim 5, wherein the variable aperture is settable to a specific aperture size, the optical device further comprising:

shutter which is released to take a photograph;

release initiation device which initiates release of the shutter when the photographer indicates that the shutter is to be released;

a variable aperture control device which:
  determines a specific variable aperture size for a respective photograph which is to be taken,
  drives the variable aperture to the specific variable aperture size after the initiation of the shutter release by the release initiation device, where $t_1$ equals the time from the initiation of the shutter release by the release initiation device to the time when driving of the variable aperture is complete and the variable aperture is set at the specific variable aperture size,
  makes the time $t_1$ for each photograph constant by varying, in accordance with the variable aperture size, the time from the initiation of the shutter release by the release initiation device to the start of driving of the variable aperture; and a shutter control device which causes the shutter to be released after a specific time period $t_2$ elapses after the initiation of the shutter release by the release initiation device, the time period $t_2$ being greater than $t_1$.

8. An optical device as in claim 1, wherein the optical device is a camera having a continuous shooting mode and the variable aperture is settable to a specific aperture size, the variable aperture having a maximum aperture size and a minimum aperture size, the optical device further comprising a variable aperture control device which:

sets the variable aperture to a first aperture size before a first photograph is taken when the optical device is in the continuous shooting mode, determines, after the first photograph is taken, a new aperture size of the variable aperture for the next photograph and, drives, after the first photograph is taken, the variable aperture from the first aperture size directly to the new aperture size.

9. An optical device as in claim 8, wherein the variable aperture is settable to a specific aperture size, the optical device further comprising:

shutter which is released to take a photograph;

release initiation device which initiates release of the shutter when the photographer indicates that the shutter is to be released;

variable aperture control device which:
 determines a specific variable aperture size for a respective photograph which is to be taken,
 drives the variable aperture to the specific variable aperture size after the initiation of the shutter release by the release initiation device, where $t_1$ equals the time from the initiation of the shutter release by the release initiation device to the time when driving of the variable aperture is complete and the variable aperture is set at the specific variable aperture size,
 makes the time $t_1$ for each photograph constant by varying, in accordance with the variable aperture size, the time from the initiation of the shutter release by the release initiation device to the start of driving of the variable aperture; and shutter control device which causes the shutter to be released after a specific time period $t_2$ elapses after the initiation of the shutter release by the release initiation device, the time period $t_2$ being greater than $t_1$.

10. An optical device as in claim 1, wherein optical device is a camera and the variable aperture is settable to a specific aperture size, the optical device further comprising:

a shutter which is released to take a photograph;

release initiation device which initiates release of the shutter when the photographer indicates that the shutter is to be released;

variable aperture control device which:
 determines a specific variable aperture size for a respective photograph which is to be taken,
 drives the variable aperture to the specific variable aperture size after the initiation of the shutter release by the release initiation device, where $t_1$ equals the time from the initiation of the shutter release by the release initiation device to the time when driving the variable aperture is complete and the variable aperture is set at the specific variable aperture size,
 makes the time $t_1$ for each photograph constant by varying, in accordance with the variable aperture size, the time from the initiation of the shutter release by the release initiation device to the start of driving of the variable aperture; and shutter control device which causes the shutter to be released after a specific time period $t_2$ elapses after the initiation of the shutter release by the release initiation device, the time period $t_2$ being greater than $t_1$.

11. An optical device as in claim 1, wherein the optical device is a camera.

12. An optical device which forms an image of a subject on an image recording medium, the optical device comprising:

a picture taking lens passing light from the subject and forming an image of the subject on an image forming plane;

a picture taking optical system having an optical path extending from the image forming plane to the image recording medium, the picture taking optical system receiving the image formed on the image forming plane and projecting the image to the image recording medium; and variable aperture regulating the quantity of light passing therethrough and positioned in the optical path of the picture taking optical system between the image forming plane and the image recording medium.

13. An optical device as in claim 12, wherein the picture taking optical system includes a relay optical system and the variable aperture is in the relay optical system.

14. An optical device as in claim 13, wherein the optical device is a camera and the variable aperture is settable to a specific aperture size, the variable aperture having a maximum aperture size and a minimum aperture size, the optical device further comprising a variable aperture control device which, after a photograph is taken, sets the aperture size of the variable aperture to an aperture size which is approximately midway between the maximum aperture size and the minimum aperture size.

15. An optical device as in claim 14, wherein the variable aperture control device sets the aperture size of the variable aperture to an aperture size which is approximately midway between the maximum aperture size and the minimum aperture size before the first photograph is taken after the optical device is turned ON.

16. An optical device as in claim 12, wherein the optical device is a camera and the variable aperture is settable to a specific aperture size, the variable aperture having a maximum aperture size and a minimum aperture size, the optical device further comprising a variable aperture control device which, after a photograph is taken, sets the aperture size of the variable aperture to an aperture size which is approximately midway between the maximum aperture size and the minimum aperture size.

17. An optical device as in claim 16, wherein the optical device is a camera and the variable aperture control device sets the aperture size of the variable aperture to an aperture size which is approximately midway between the maximum aperture size and the minimum aperture size before the first photograph is taken after the optical device is turned ON.

18. An optical device as in claim 16, wherein the optical device is a camera and further comprises:

shutter which is released to take a photograph;

release initiation device which initiates release of the shutter when the photographer indicates that the shutter is to be released;

a variable aperture control device which:
 determines a specific variable aperture size for a respective photograph which is to be taken, drives the variable aperture to the specific variable aperture size after the initiation of the shutter release by the release initiation device, where $t_1$ equals the time from the initiation of the shutter release by the release initiation device to the time when driving of the variable aperture is complete and the variable aperture is set at the specific variable aperture size, makes the time $t_1$ for each photograph constant by varying, in accordance with the variable aperture size, the time from the initiation of the shutter release by the release initiation device to the start of driving of the variable aperture; and shutter control device which causes the shutter to be released after a specific time period $t_2$ elapses after the initiation of the shutter release by the release initiation device, the time period $t_2$ being greater than $t_1$.

19. An optical device as in claim 12, wherein the optical device is a camera having a continuous shooting mode and the variable aperture is settable to a specific aperture size, the variable aperture having a maximum aperture size and a minimum aperture size, the optical device further comprising a variable aperture control device which:

sets the variable aperture to a first aperture size before a first photograph is taken when the optical device is in the continuous shooting mode, determines, after the first photograph is taken, a new aperture size of the variable aperture for the next photograph and, drives, after the first photograph is taken, the variable aperture from the first aperture size directly to the new aperture size.

20. An optical device as in claim 19, further comprising:

shutter which is released to take a photograph;

a release initiation device which initiates release of the shutter when the photographer indicates that the shutter is to be released;

a variable aperture control device which:

determines a specific variable aperture size for a respective photograph which is to be taken, drives the variable aperture to the specific variable aperture size after the initiation of the shutter release by the release initiation device, where $t_1$ equals the time from the initiation of the shutter release by the release initiation device to the time when driving of the variable aperture is complete and the variable aperture is set at the specific variable aperture size, makes the time $t_1$ for each photograph constant by varying, in accordance with the variable aperture size, the time from the initiation of the shutter release by the release initiation device to the start of driving of the variable aperture; and a shutter control device which causes the shutter to be released after a specific time period $t_2$ elapses after the initiation of the shutter release by the release initiation device, the time period $t_2$ being greater than $t_1$.

21. An optical device as in claim 12, wherein the optical device is a camera and the variable aperture is settable to a specific aperture size, the optical device further comprising:

a shutter which is released to take a photograph;

a release initiation device which initiates release of the shutter when the photographer indicates that the shutter is to be released;

a variable aperture control device which:

determines a specific variable aperture size for a respective photograph which is to be taken, drives the variable aperture to the specific variable aperture size after the initiation of the shutter release by the release initiation device, where $t_1$ equals the time from the initiation of the shutter release by the release initiation device to the time when driving the variable aperture is complete and the variable aperture is set at the specific variable aperture size, makes the time $t_1$ for each photograph constant by varying, in accordance with the variable aperture size, the time from the initiation of the shutter release by the release initiation device to the start of driving of the variable aperture; and shutter control device which causes the shutter to be released after a specific time period $t_2$ elapses after the initiation of the shutter release by the release initiation device, the time period $t_2$ being greater than $t_1$.

22. An optical device as in claim 12, wherein the optical device is a camera.

* * * * *